US012597419B2

(12) United States Patent
Chun

(10) Patent No.: US 12,597,419 B2
(45) Date of Patent: Apr. 7, 2026

(54) NATURAL LANGUAGE PROCESSING APPARATUS AND NATURAL LANGUAGE PROCESSING METHOD

(71) Applicants: HYUNDAI MOTOR COMPANY, Seoul (KR); KIA CORPORATION, Seoul (KR)

(72) Inventor: Chang Woo Chun, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 278 days.

(21) Appl. No.: 18/083,119

(22) Filed: Dec. 16, 2022

(65) Prior Publication Data

US 2023/0267923 A1 Aug. 24, 2023

(30) Foreign Application Priority Data

Feb. 23, 2022 (KR) ........................ 10-2022-0023903

(51) Int. Cl.
*G10L 15/18* (2013.01)
*G06F 40/166* (2020.01)
*G06F 40/30* (2020.01)
*G10L 15/22* (2006.01)

(52) U.S. Cl.
CPC ........ *G10L 15/1815* (2013.01); *G06F 40/166* (2020.01); *G06F 40/30* (2020.01); *G10L 15/22* (2013.01); *G10L 2015/223* (2013.01)

(58) Field of Classification Search
CPC ................................ G06F 40/166; G06F 40/30
See application file for complete search history.

(56) References Cited

U.S. PATENT DOCUMENTS

| | | | | |
|---|---|---|---|---|
| 11,735,207 B1 * | 8/2023 | Venkataraman | ........ | G10L 15/26 704/200 |
| 2008/0256071 A1 * | 10/2008 | Prasad | .................. | G06F 40/166 704/235 |
| 2015/0370787 A1 * | 12/2015 | Akbacak | ................. | G06F 40/47 704/2 |
| 2017/0069315 A1 * | 3/2017 | Chung | .................... | G06F 40/20 |
| 2018/0374482 A1 * | 12/2018 | Woo | ........................ | G10L 15/26 |
| 2019/0051288 A1 | 2/2019 | Lee et al. | | |
| 2020/0342874 A1 * | 10/2020 | Teserra | ................. | G06F 40/263 |
| 2021/0173862 A1 * | 6/2021 | Chen | ..................... | G06F 40/289 |
| 2021/0217408 A1 * | 7/2021 | Hakkani-Tur | .......... | G06N 3/02 |
| 2021/0360109 A1 * | 11/2021 | Rico Ródenas | .... | H04M 3/5235 |
| 2022/0246141 A1 * | 8/2022 | Mirrezaei | ............... | G06F 40/30 |

FOREIGN PATENT DOCUMENTS

KR        20190018282 A      2/2019

* cited by examiner

*Primary Examiner* — Daniel C Washburn
*Assistant Examiner* — Paul J. Mueller
(74) *Attorney, Agent, or Firm* — Lempia Summerfield Katz LLC

(57) ABSTRACT

The present disclosure provides a natural language processing apparatus and a natural language processing method that may determine whether a user's speech command is a compound sentence or a complex sentence based on an output of a natural language understanding module, and when the user's speech command is a compound sentence or a complex sentence, recursively call the natural language understanding module, thereby executing all of the plurality of functions expressed as a single sentence.

20 Claims, 11 Drawing Sheets

| OPERATION | RESULT |
|---|---|
| 1100 | RECOGNIZE AS<br>"OPEN SUNROOF AND WINDOW" |
| 1200 | [open_sunroof, 0.46]<br>[open_window, 0.26]<br>[open_all window, 0.04] |
| 1300 | {SUNROOF : OPENING AND CLOSING DEVICE}<br>{WINDOW : OPENING AND CLOSING DEVICE} |
| 1400 | ACTION: 1,<br>SLOT: 2  →  COMPOUND SENTENCE |
| 1600 | [open_sunroof]<br>[open_window] |
| 1700 | {SUNROOF : TARGET}<br>{WINDOW : TARGET} |
| 1800 | SUNROOF – OPEN : O<br>WINDOW – OPEN : O |
| 1900 | SYSTEM RESPONSE<br>+<br>MULTIPLE FUNCTION EXECUTION |

FIG. 8

| OPERATION | RESULT |
|---|---|
| 1100 | RECOGNIZE AS "OPEN SUNROOF AND MUSIC" |
| 1200 | [open_sunroof, 0.50]<br>[play_music, 0.12]<br>[close_sunroof, 0.01] |
| 1300 | {SUNROOF : OPENING AND CLOSING DEVICE}<br>{MUSIC : CONTENT} |
| 1400 | SINGLE SENTENCE   →   [open_sunroof, 0.50] |
| 1800 | SUNROOF − OPEN = O |
| 1900 | SYSTEM RESPONSE<br>+<br>SINGLE FUNCTION EXECUTION |

FIG. 9

| OPERATION | RESULT |
|---|---|
| 1100 | RECOGNIZE AS<br>"CLOSE SUNROOF AND WINDOW AND PLAY MUSIC" |
| 1200 | [play_music : 0.42]<br>[Close_window : 0.24]<br>[Close_sunroof : 0.21] |
| 1300 | {SUNROOF : OPENING AND CLOSING DEVICE}<br>{WINDOW : OPENING AND CLOSING DEVICE}<br>{MUSIC : CONTENT} |
| 1400 | ACTION: 2,<br>SLOT: 3    →   COMPLEX SENTENCE |
| 1600 | [play_music]<br>[Close_window]<br>[Close_sunroof] |
| 1700 | {SUNROOF : TARGET}<br>{WINDOW : TARGET}<br>{MUSIC : TARGET} |
| 1800 | SUNROOF - CLOSE : O<br>WINDOW - CLOSE : O<br>MUSIC - PLAY : O |
| 1400 | SYSTEM RESPONSE<br>+<br>MULTIPLE FUNCTION EXECUTION |

FIG. 11

| OPERATION | RESULT |
|---|---|
| 2100 | RECOGNIZE AS<br>"WHEN I SAY I AM SLEEPY,<br>OPEN SUNROOF AND WINDOW AND PLAY MUSIC" |
| 2200 | [register_personal command] |
| 2300 | {I AM SLEEPY: COMMAND}<br>{OPEN SUNROOF AND WINDOW<br>AND PLAY MUSIC: FUNCTIONAL SPEECH} |
| 1200 | [open_sunroof, 0.46]<br>[open_window, 0.22]<br>[play_music, 0.21] |
| 1300 | {SUNROOF : OPENING AND CLOSING DEVICE}<br>{WINDOW : OPENING AND CLOSING DEVICE}<br>{MUSIC : CONTENT} |
| 1400 | ACTION: 2,<br>SLOT: 3  →  COMPLEX SENTENCE |
| 1600 | [open_sunroof]<br>[open_window]<br>[play_music] |
| 1700 | {SUNROOF : TARGET}<br>{WINDOW : TARGET}<br>{MUSIC : TARGET} |
| 1800 | SUNROOF - OPEN : O<br>WINDOW - OPEN : O<br>MUSIC - PLAY : O |
| 1900 | SYSTEM RESPONSE<br>+<br>MULTIPLE FUNCTION EXECUTION |

NATURAL LANGUAGE PROCESSING APPARATUS AND NATURAL LANGUAGE PROCESSING METHOD

CROSS-REFERENCE TO RELATED APPLICATION

This application is based on and claims priority under 35 U.S.C. § 119 to Korean Patent Application No. 10-2022-0023903, filed on Feb. 23, 2022 in the Korean Intellectual Property Office, the disclosure of which is incorporated herein by reference.

BACKGROUND

1. Technical Field

The present disclosure relates to a natural language processing apparatus and a natural language processing method that may process a user's speech that is a compound sentence or a complex sentence.

2. Description of the Related Art

A natural language processing apparatus is an apparatus capable of identifying a user intention through dialogues with a user. Such a natural language processing apparatus is connected to various electronic devices used in everyday life such as vehicles, mobile devices, home appliances to allow a variety of functions corresponding to a user's speech command to be performed.

To identify what is intended by a user from a user's speech command, the natural language processing apparatus is required to process a user's speech command in natural language. Natural languages refer to any language used in people's daily lives for communication, in contrast to an artificial language or constructed language such as a computer programming language.

The natural language processing apparatus may identify a user intention according to predetermined principles, or through machine learning. In either case, an existing natural language processing apparatus extracts a single intention from a single input sentence. Accordingly, when a user inputs a speech command for a plurality of functions as a single sentence, all the desired functions may not be performed.

SUMMARY

An aspect of the present disclosure provides a natural language processing apparatus and a natural language processing method that may determine whether a user's speech command is a compound sentence or a complex sentence based on an output of a natural language understanding module, and when the user's speech command is a compound sentence or a complex sentence, recursively call the natural language understanding module, thereby executing all of the plurality of functions expressed as a single sentence.

Additional aspects of the present disclosure are set forth in part in the description which follows and, in part, is understood from the description, or may be learned by practice of the present disclosure.

According to an embodiment of the present disclosure, there is provided a natural language processing apparatus. The natural language processing includes: a speech recognition module configured to convert a speech command of a user to a text; a natural language understanding module configured to classify an intent corresponding to the speech command and extract a slot included in the speech command based on the text; and a control module configured to determine whether the speech command includes a compound sentence or a complex sentence based on the intent classified by the natural language understanding module, and when the speech command includes the compound sentence or the complex sentence, input a text corresponding to the speech command to the natural language understanding module again.

The natural language understanding module is configured to calculate a matching probability of the speech command for each of a plurality of pre-defined intents, to classify the intent corresponding to the speech command.

In the above paragraphs, the control module is configured to determine that the speech command includes the compound sentence or the complex sentence, when a highest matching probability among the calculated matching probabilities is less than a first reference value and two or more matching probabilities are greater than a second reference value.

In the above paragraphs, the control module is configured to determine that the speech command includes the compound sentence when a top M number of intents have an identical action and different slots (M is an integer greater than or equal to 2) based on the calculated matching probabilities. The control module is also configured to determine that the speech command includes the complex sentence when two or more intents among the top M number of intents have different actions.

In the above paragraphs, when the speech command includes the complex sentence, the control module is configured to divide the text converted from the speech command into a plurality of sentences and input the divided plurality of sentences to the natural language understanding module again.

In the above paragraphs, the natural language understanding module is configured to determine a final intent and a final slot for the re-input text, based on information about a top M number of intents based on the calculated matching probabilities.

In the above paragraphs, the control module is configured to determine a consistency between the final intent and the final slot.

In the above paragraphs, the control module is configured to generate a result processing signal for performing a function corresponding to the final intent whose consistency with the final slot is acknowledged.

According to an embodiment of the present disclosure, there is provided a natural language processing apparatus. The natural language processing apparatus includes: a speech recognition module configured to convert a speech command of a user to a text; a natural language understanding module configured to classify an intent corresponding to the speech command and extract a slot included in the speech command based on the text; and a control module configured to input a functional speech indicating a function to be registered that matches a personal command to the natural language understanding module again, when the intent classified by the natural language understanding module is registration of the personal command.

In the above paragraphs, the natural language understanding module is configured to classify an intent corresponding to the re-input functional speech and extract a slot included in the re-input functional speech.

In the above paragraphs, the control module is configured to store a function, defined by the intent corresponding to the functional speech and the slot included in the functional speech, as the function corresponding to the personal command.

In the above paragraphs, the control module is configured to generate a control signal for performing the function corresponding to the personal command, when a speech command of the user input after the personal command is registered includes the registered personal command.

According to an embodiment of the present disclosure, there is provided a natural language processing method. The natural language processing method includes: converting, by a speech recognition module, a speech command of a user to a text; classifying, by a natural language understanding module, an intent corresponding to the speech command and extracting a slot included in the speech command based on the text; determining, by a control module, whether the speech command includes a compound sentence or a complex sentence based on the classified intent; and when the speech command includes the compound sentence or the complex sentence, inputting, by the control module, the text corresponding to the speech command to the natural language understanding module again.

In the above paragraphs, the determining of whether the speech command includes the compound sentence or the complex sentence includes calculating a matching probability of the speech command for each of a plurality of pre-defined intents, to classify the intent corresponding to the speech command.

In the above paragraphs, the determining of whether the speech command includes the compound sentence or the complex sentence includes determining that the speech command includes the compound sentence or the complex sentence, when a highest matching probability among the calculated matching probabilities is less than a first reference value and two or more matching probabilities are greater than a second reference value.

In the above paragraphs, the determining of whether the speech command includes the compound sentence or the complex sentence includes determining that the speech command includes the compound sentence, when a top M number of intents have an identical action and different slots (M is an integer greater than or equal to 2) based on the calculated matching probabilities, and determining that the speech command includes the complex sentence when two or more intents among the top M number of intents have different actions.

In the above paragraphs, the inputting of the text corresponding to the speech command to the natural language understanding module again includes, when the speech command includes the complex sentence, dividing the text converted from the speech command into a plurality of sentences, and inputting the divided plurality of sentences to the natural language understanding module again.

In the above paragraphs, the natural language processing method further includes determining a final intent and a final slot for the re-input text, based on information about a top M number of intents based on the calculated matching probabilities.

In the above paragraphs, the natural language processing method further includes determining a consistency between the final intent and the final slot.

In the above paragraphs, the natural language processing method further includes generating a result processing signal for performing a function corresponding to the final intent whose consistency with the final slot is acknowledged.

BRIEF DESCRIPTION OF THE DRAWINGS

These and/or other aspects of the present disclosure should become apparent and more readily appreciated from the following description of the embodiments, taken in conjunction with the accompanying drawings of which:

FIG. 3 is a diagram schematically illustrating a relationship between a vehicle and a natural language processing apparatus according to an embodiment;

FIGS. 7-9 are diagrams illustrating each processes for different speech commands, in a natural language processing method according to an embodiment;

FIG. 11 is a diagram illustrating an example of a process of registering a personal command by a user, in a natural language processing method according to an embodiment.

DETAILED DESCRIPTION

Figure 1:
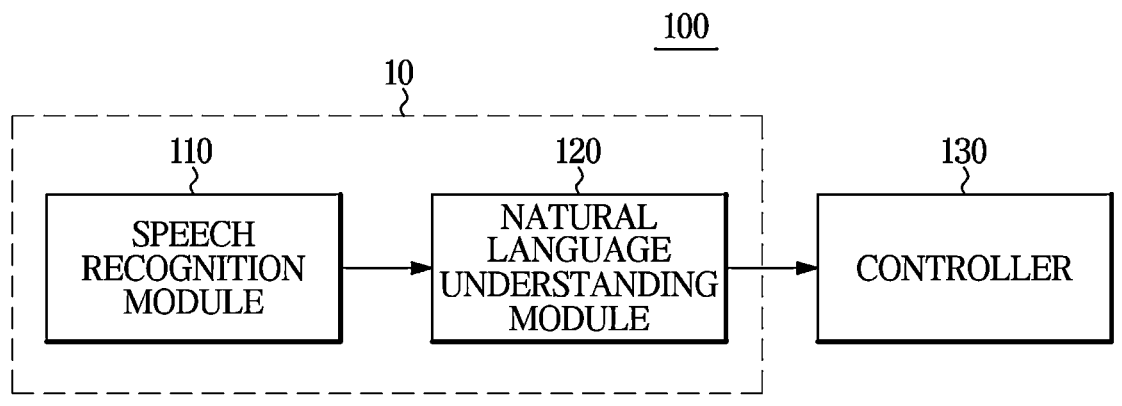
FIG. 1 is a block diagram illustrating a natural language processing apparatus according to an embodiment.

The embodiments set forth herein and illustrated in the configuration of the present disclosure are only example embodiments, so it should be understood that they may be replaced with various equivalents and modifications at the time of the present disclosure.

Like reference numerals throughout the specification denote like elements.

Terminologies used herein are for the purpose of describing particular embodiments only and is not intended to limit the present disclosure. It is to be understood that the singular forms are intended to include the plural forms as well, unless the context clearly dictates otherwise. It is further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

It is understood that, although the terms first, second, and the like may be used herein to describe various elements, these elements should not be limited by these terms. For example, without departing from the technical spirit or essential features of the present disclosure, a first element may be referred to as a second element, and also a second element may be referred to as a first element. Descriptions shall be understood as to include any and all combinations of one or more of the associated listed items when the items are described by using the conjunctive term "~and/or~", or the like.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), or software stored in memories or processors.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Hereinafter, embodiments of a natural language processing apparatus and a natural language processing method are described in detail with reference to the accompanying drawings.

FIG. 1 is a block diagram illustrating a natural language processing apparatus according to an embodiment.

A natural language processing apparatus 100 according to an embodiment includes a speech processing module 10 that extracts information required to perform a control intended by a user, and a control module 130 that generates a control signal for performing the control intended by the user.

The speech processing module 10 may include a speech recognition module 110 for converting a user's speech into text and a natural language understanding module 120 for determining a user intention corresponding to the text.

The speech recognition module 110 may be implemented with a speech to text (STT) engine and perform conversion into text by applying a speech recognition algorithm to the user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition module 110 may convert the user's speech into the text based on learning, where deep learning or machine learning is applied. In the disclosed embodiments, a way of converting the user's speech into the text by the speech recognition module 110 is not limited thereto, and a variety of speech recognition techniques may be applied to convert the user's speech into the text.

The natural language understanding module 120 may apply a natural language understanding (NLU) technique to determine user intention included in the text. Accordingly, the natural language understanding module 120 may include an NLU engine that determines the user intention by applying the NLU technique to an input sentence. The text output by the speech recognition module 110 may be a sentence input to the natural language understanding module 120.

For instance, the natural language understanding module 120 may recognize an entity name from the input sentence. The entity name may be a proper noun such as a name of an individual person, place, organization, time, day, currency, and the like. Named-entity recognition (NER) is for identifying an entity name in a sentence and classifying a type of the identified entity. A keyword may be extracted from a sentence through named-entity recognition to understand the meaning of the sentence.

Also, the natural language understanding module 120 may determine a domain from the input sentence. The domain may be for identifying a subject of the user's speech. For example, domains representing various subjects such as a vehicle control, schedule, information about weather or traffic conditions, text transmission, navigation, and the like, may be determined based on the input sentence.

In addition, the natural language understanding module 120 may analyze a speech act of the input sentence. Speech act analysis is for analyzing an intention of speech, such as whether the user asks a question, makes a request, responds, or simply expresses the user's emotions.

Further, the natural language understanding module 120 may classify an intent corresponding to the input sentence and extract an entity required to perform the intent.

For example, when the input sentence is "turn on the air conditioner", a domain may be [vehicle control], and an intent may be [turn on, air conditioner]. In the example, the intent is defined as [action_target]. In this example, [turn on] may be an action, [air conditioner] may be a target, and an entity required to perform control corresponding to such intent may be [temperature, air volume].

However, a term used for each natural language processing apparatus and a definition thereof may vary. Accordingly, even though a term different from 'action', 'target', and the like, is used, as long as a meaning or a role thereof in the natural language understanding module is the same or similar, the term may be encompassed by the scope of the present disclosure.

As described above, the operation of extracting required information such as an intent, a domain, an entity, and the like, from an input sentence by the natural language understanding module 120 may be performed based on rules, or based on machine learning or deep learning, which is described below.

The control module 130 may perform processing on the result of the speech recognition and natural language understanding, and output a result processing signal to a user terminal or an external server, in order to provide a service corresponding to a user intention. For example, the control module 130 may generate and output a control signal for performing a control corresponding to an intent extracted from a user's speech.

The user terminal may serve as a gateway between the user and the natural language processing apparatus 100. The user terminal may be a mobile device provided with an input/output interface such as a microphone, a speaker, a display, and the like, or be a vehicle itself. When the user terminal is a mobile device, the vehicle and the mobile device may be connected to each other through a wireless communication such as Bluetooth, or through a cable connection.

For example, when a service corresponding to a user intention is a vehicle-related control, the control module 130 may generate a control signal for performing the corresponding control and transmit the control signal to the user terminal.

Alternatively, when a service corresponding to a user intention is provision of specific information, the control module 130 may search for the specific information and transmit the retrieved information to the user terminal. Information retrieval may be performed by an external server, when required.

Alternatively, when a service corresponding to a user intention is provision of specific content, the control module 130 may request to an external server providing the corresponding content.

Alternatively, when a service corresponding to a user intention is simply continuation of a dialogue, the control module 130 may generate a response to a user's speech and output the response by voice.

The above-described natural language processing apparatus 100 may be implemented with at least one memory storing a program performing the aforementioned operations and at least one processor implementing a stored program.

The constituent components of the natural language processing apparatus 100 illustrated in FIG. 1 are divided based on their operation or function, and all or a portion of the constituent components may share the memory or processor. In other words, the speech recognition module 110, the natural language understanding module 120, and the control module 130 are not necessarily physically separated from each other.

Figure 2:
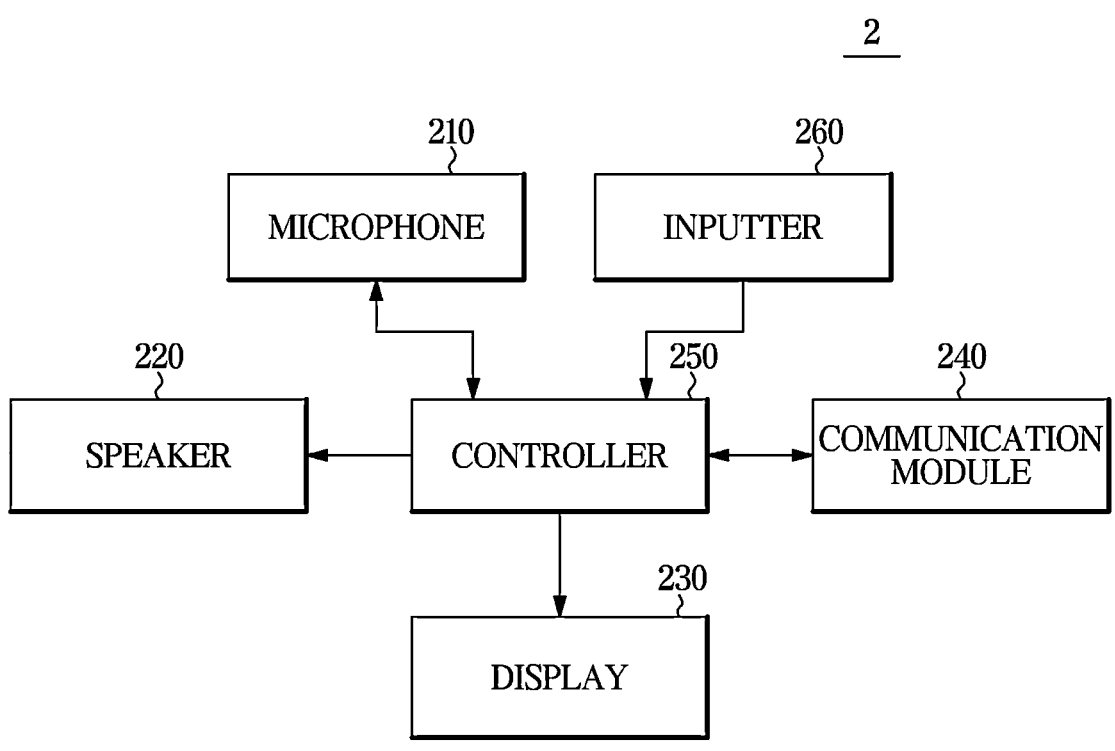
FIG. 2 is a block diagram illustrating a vehicle according to an embodiment.
Figure 3:
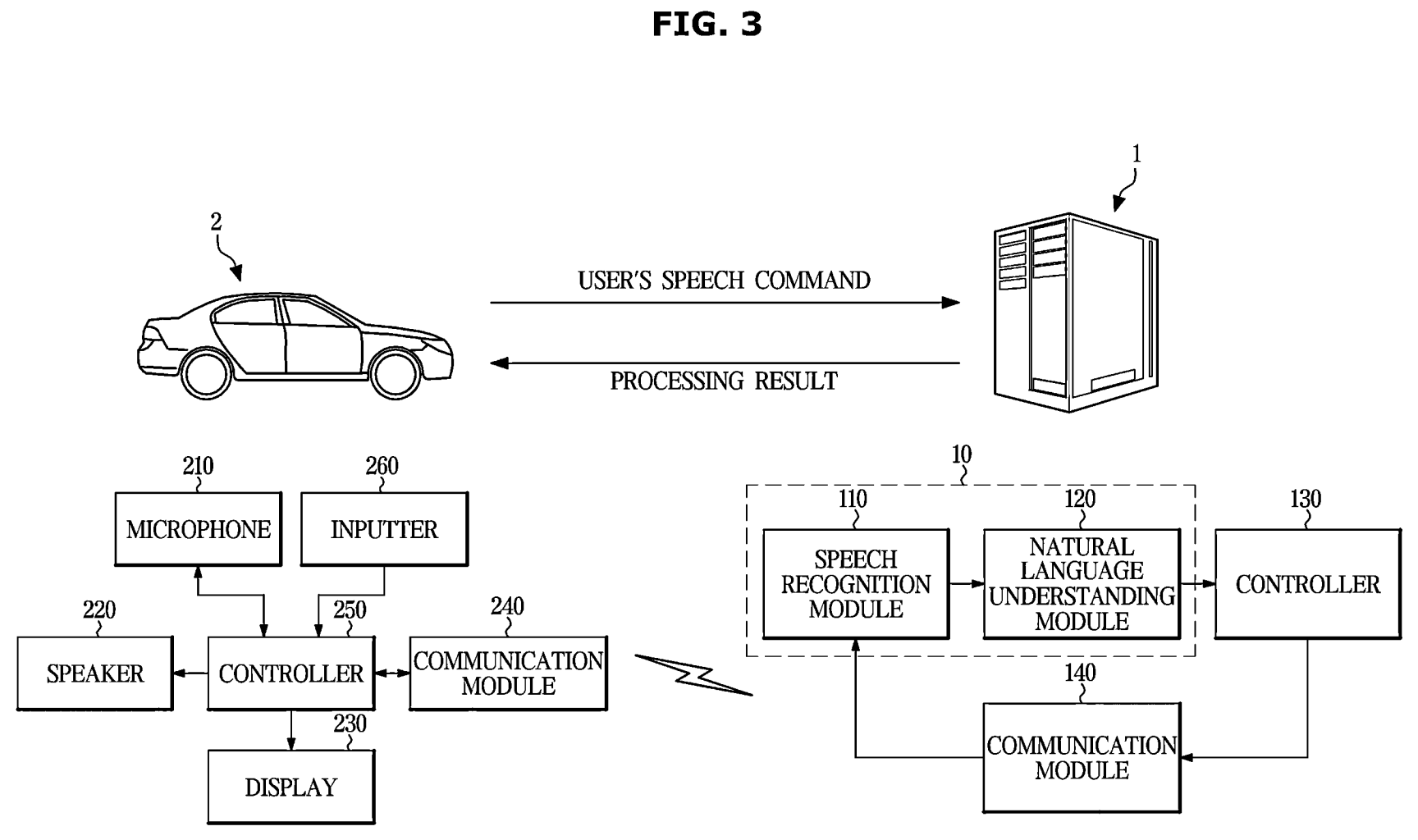

FIG. 2 is a block diagram illustrating a vehicle according to an embodiment. FIG. 3 is a diagram schematically illustrating a relationship between a vehicle and a natural language processing apparatus according to an embodiment.

Referring to FIG. 2, a vehicle 2 includes a microphone 210 to which a user's speech is input, a speaker 220 outputting a sound required to provide a service desired by a user, a display 230 displaying an image required to provide a service desired by the user, a communication module 240 performing communication with an external device, and a controller 250 controlling the above-described constituent components and other constituent components of the vehicle 2.

The microphone 210 may be provided inside the vehicle 2 to receive a user's speech. The user that inputs the user's speech to the microphone 210 of the vehicle 2 may be a driver. The microphone 210 may be provided on a steering wheel, a center fascia, a headliner, or a rear-view mirror, and the like, to receive a speech from the driver.

Various audios generated around the microphone 210 may be input to the microphone 210 in addition to the user's speech. The microphone 210 may output an audio signal corresponding to the audio input to the microphone 210. The output audio signal may be processed by the controller 250 or transmitted to the natural language processing apparatus 100 provided in an external server through the communication module 240.

The vehicle 2 may also include an inputter 260 for manually receiving a user command in addition to the microphone 210. The inputter 260 may include an inputter provided as a jog shuttle or a button, in an area where an audio, video, navigation (AVN) display is provided on a center fascia, in an area where a gearbox is provided, or on a steering wheel.

Also, to receive a control command related to passenger seats, the inputter 260 may include an inputter provided on each door of the vehicle 2, and an inputter provided on a front armrest or a rear armrest.

Further, the inputter 260 may include a touchpad like a touchscreen provided integrally with the display 230.

The display 230 may include an AVN display provided on a center fascia of the vehicle 2, a cluster display, or a head-up display (HUD). Alternatively, the display 230 may include a rear seat display provided on a back of the front seat's headrest so that a rear occupant may see the rear seat display. When the vehicle 2 is a multi-seater vehicle, the display 230 may include a display mounted on a headliner of the vehicle 2.

The display 230 may be provided anywhere as long as users inside the vehicle 2 may see the display 230. The position or the number of displays 230 are not limited.

The communication module 240 may transmit and receive a signal with other devices by using at least one of various wireless communication methods, such as Bluetooth, 4G, 5G, Wi-Fi, and the like. Alternatively, the communication module 240 may transmit and receive information with other devices through a cable connected to a USB terminal, an AUX terminal, and the like.

Also, the communication module 240 may be provided with two or more communication interfaces that support different communication methods to transmit and receive a signal and information with two or more other devices.

For example, the communication module 240 may communicate with a mobile device located inside the vehicle 2 through a Bluetooth communication, thereby receiving information (user images, user speech, contact numbers, schedules, and the like) obtained by or stored in the mobile device. Also, the communication module 240 may communicate with a server 1 through a 4G or 5G communication method, thereby transmitting a user's speech and receiving a signal required to provide a service desired by the user. In addition, the communication module 240 may transmit and receive a signal with the server 1 through a mobile device connected to the vehicle 2.

Further, the vehicle 2 may include a navigation device for route guidance, an air conditioning device for adjusting an indoor temperature, a window adjustment device for opening/closing vehicle windows, a seat heating device for heating seats, a seat adjustment device for adjusting a position, height, angle of a seat and a lighting device for adjusting an indoor illuminance level, and the like.

The aforementioned constituent components are for providing convenience functions related to the vehicle 2, and a portion of the constituent components may be omitted depending on models or options. Also, other constituent components may be further included in the vehicle 2 in addition to the above constituent components. Configurations related to driving of the vehicle 2 are well-known, and thus a description thereof is omitted herein.

The controller 250 may turn on or off the microphone 210, process and store a speech input to the microphone 210, and transmit to another device through the communication module 240.

Also, the controller 250 may control the display 230 to display an image, and control the speaker 220 to output a sound.

In addition, the controller 250 may perform various controls related to the vehicle 2. For example, the controller 250 may control at least one of the navigation device, the air conditioning device, the window adjustment device, the seat heating device, the seat adjustment device or the lighting device, according to a user command input through the inputter 260 or the microphone 210.

The controller 250 may include at least one memory storing a program performing the aforementioned operations or operations to be described below and at least one processor implementing a stored program.

Referring to FIG. 3, the natural language processing apparatus 100 may be provided in the server 1. Accordingly, a user's speech command input to the vehicle 2 may be transmitted to a communication module 140 of the server 1, and when a voice signal is processed by the natural language processing apparatus 100 provided in the server 1, the communication module 140 may transmit a processing result to the vehicle 2 again.

The communication module 140 may transmit and receive a signal with other devices by using at least one of various wireless communication methods such as Bluetooth, 4G, 5G, Wi-Fi, and the like.

All or a portion of the constituent components of the natural language processing apparatus 100 may be provided in the vehicle 2. For example, the speech recognition module 110 may be provided in the vehicle 2, and the natural language understanding module 120 and the control module 130 may be provided in the server 1.

As another example, the speech recognition module 110 and the control module 130 may be provided in the vehicle 2 and the natural language understanding module 120 may be provided in the server 1, or the speech recognition module 110 and the natural language understanding module 120 may be provided in the server 1 and the control module 130 may be provided in the vehicle 2.

As still another example, the natural language processing apparatus 100 may be provided in the vehicle 2.

Although all or a portion of the constituent components of the natural language processing apparatus 100 may be provided in the vehicle 2 as described above, an example where the natural language processing apparatus 100 is provided in the server 1, as shown in FIG. 3, is described in the below-described embodiment.

Figure 4:
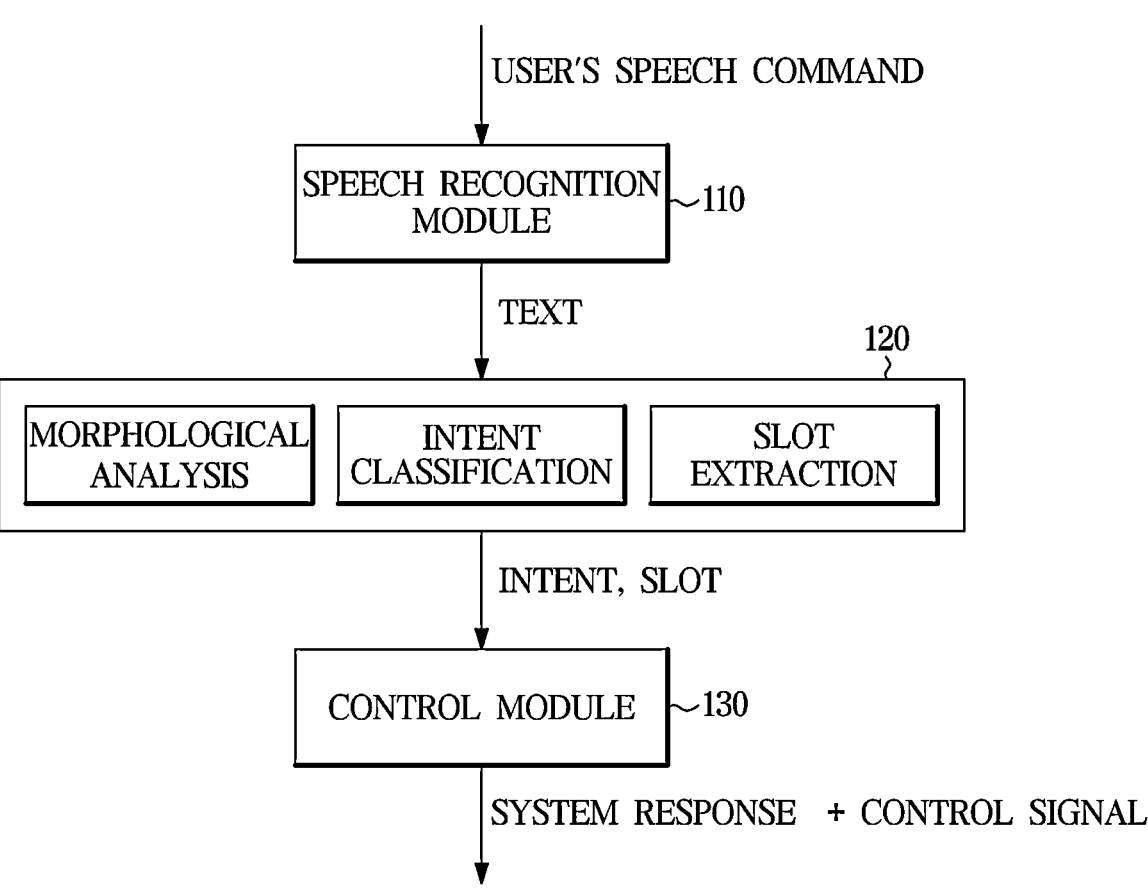
FIG. 4 is a block diagram illustrating operations performed in each module of a natural language processing apparatus according to an embodiment.
Figure 5:
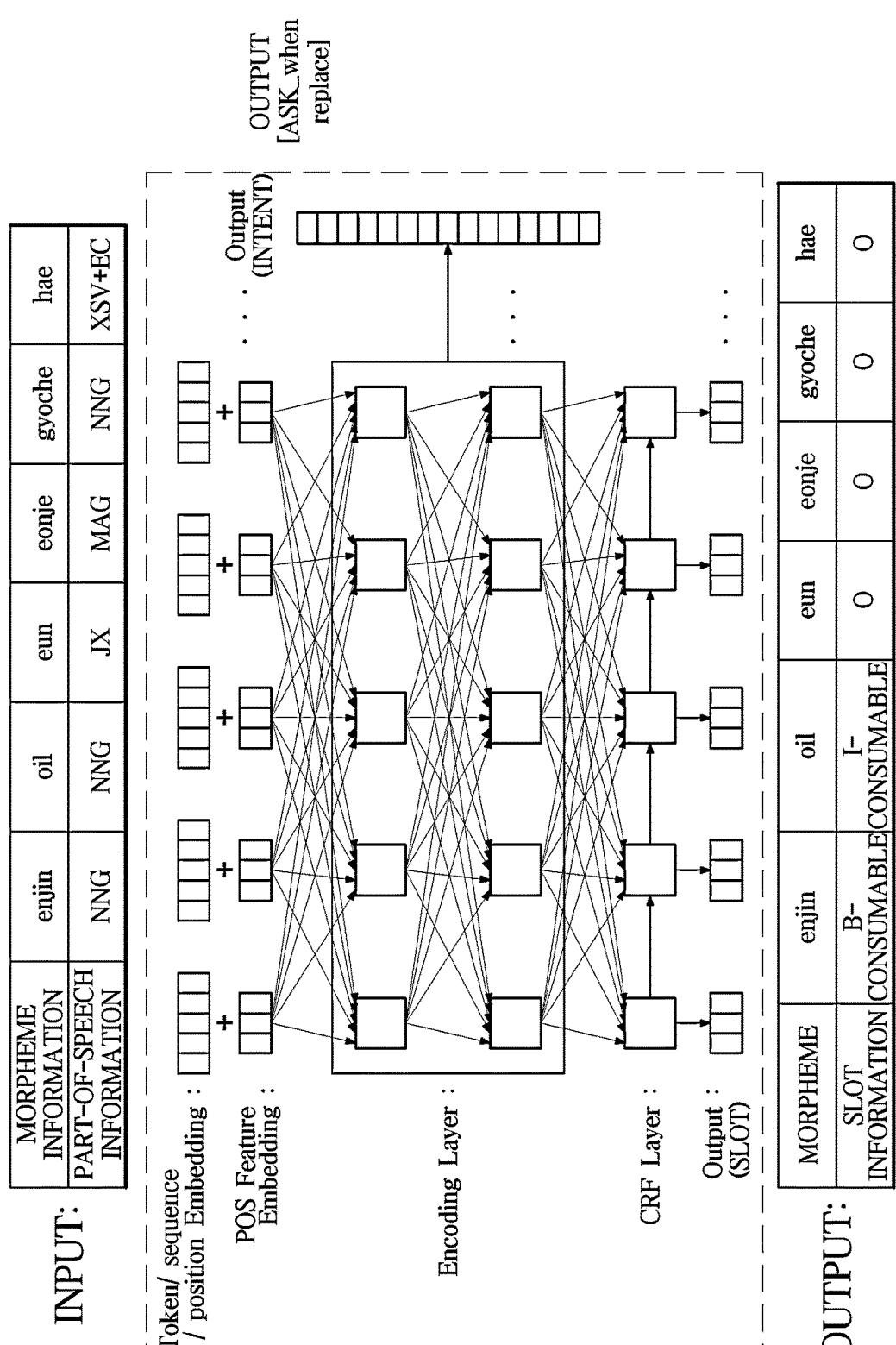
FIG. 5 is a diagram schematically illustrating a structure of a classification model applied to a natural language understanding module of a natural language processing apparatus according to an embodiment.

FIG. 4 is a block diagram illustrating operations performed in each module of a natural language processing apparatus according to an embodiment. FIG. 5 is a diagram schematically illustrating a structure of a classification model applied to a natural language understanding module of a natural language processing apparatus according to an embodiment.

Referring to FIG. 4, when a speech command is input to the speech recognition module 110, the speech recognition module 110 performs pre-processing such as extracting a voice from the input speech command, removing noise, and the like, and then converts a pre-processed voice signal into text.

The text is input to the natural language understanding module 120, and the natural language understanding module 120 performs morphological analysis, intent classification, slot extraction, and the like, on the input text, thereby obtaining information required to identify a user intention, such as an intent, a slot, and the like.

Referring to FIG. 4 and FIG. 5 together, the natural language understanding module 120 may divide the input sentence into smaller units for natural language analysis, i.e., a token. For example, morpheme analysis may be performed to divide the input sentence into tokens in morpheme units.

According to the morpheme analysis, the input sentence may be separated into morphemes, which are the smallest units of meaning. A morpheme represents the smallest unit in which meaning is analyzable. A morpheme may be a word or a part of a word indicating a grammatical or relational meaning, and may include a root, an ending, a proposition, a prefix, a suffix, and the like of a simple word.

For example, when the input sentence is "enjin oil eun eonje gyoche hae" which means let me know when to replace engine oil', a result of morpheme analysis may be obtained as shown in FIG. 5, and part-of-speech tagging may be performed for each morpheme.

As an example, the natural language understanding module 120 may classify an intent corresponding to a user's speech command and extract a slot, by a deep learning model.

An input sequence input to the deep learning model may consist of tokens, and a word embedding vector generated by performing word embedding on the input sequence may be input to an encoding layer. Also, sequence embedding, position embedding, and the like, may be performed together to improve performance.

The encoding layer may encode tokens of the input sequence expressed as a vector. The encoding layer may include a plurality of hidden layers, and use an algorithm such as a recurrent neural network (RNN), a bidirectional gated recurrent units, and the like.

The deep learning model may classify an intent based on an output of the encoding layer. For example, an intent corresponding to an input sentence may be classified by comparing a vector of a pre-defined intent with an encoded input sequence. In this instance, the input sentence may be matched to the intent by using a softmax function which is one of activation functions used in the classification process.

In the example, [Ask_when replace] may be classified as an intent having a highest matching probability of the input sentence.

Also, the deep learning model may extract a slot by using a conditional random field (CRF) layer. Each hidden state of encoding layer may be input to the CRF layer. Alternatively, a long short-term memory model (LSTM) may be used for slot extraction.

A slot represents meaningful information related to an intent included in a speech. A slot may be defined by a type indicating a classification system to which the value belongs, a role in a sentence, and a value. A slot may be filled by an entity described above.

A role of a slot may be dependent on an intent. For example, in a sentence of "let's go to Busan station from Seoul station", 'Seoul station' and 'Busan station' correspond to the same type of slot. However, in the sentence, their roles are different in that 'Seoul station' is a starting point and 'Busan station' is a destination. Also, 'Seoul station' in a sentence of "let me know an address of Seoul station" and 'Seoul station' in the sentence of "let's go to Busan station from Seoul station" have the same type, but different roles, because a role of 'Seoul station' in the former is a search object.

A type of a slot may be dependent on an intent. For example, in a sentence of "let me know a route to Yanghwa bridge", a type of 'Yanghwa bridge' may correspond to a point of interest (POI), but in a sentence of "play me a song, Yanghwa bridge", a type of 'Yanghwa bridge' may be classified as a song name.

In an example of FIG. 5, a type of a slot, 'engine oil', may be extracted as a 'consumable'.

Referring again to FIG. 4, when information such as an intent, slot, and the like, corresponding to the speech command is output from the natural language understanding module 120, the control module 130 may generate a result processing signal for performing a function corresponding to the speech command, based on the information such as the output intent, slot, and the like. The result processing signal may include a system response signal including a guide message about a function to be performed and a control signal required to perform an actual function.

Figure 6:
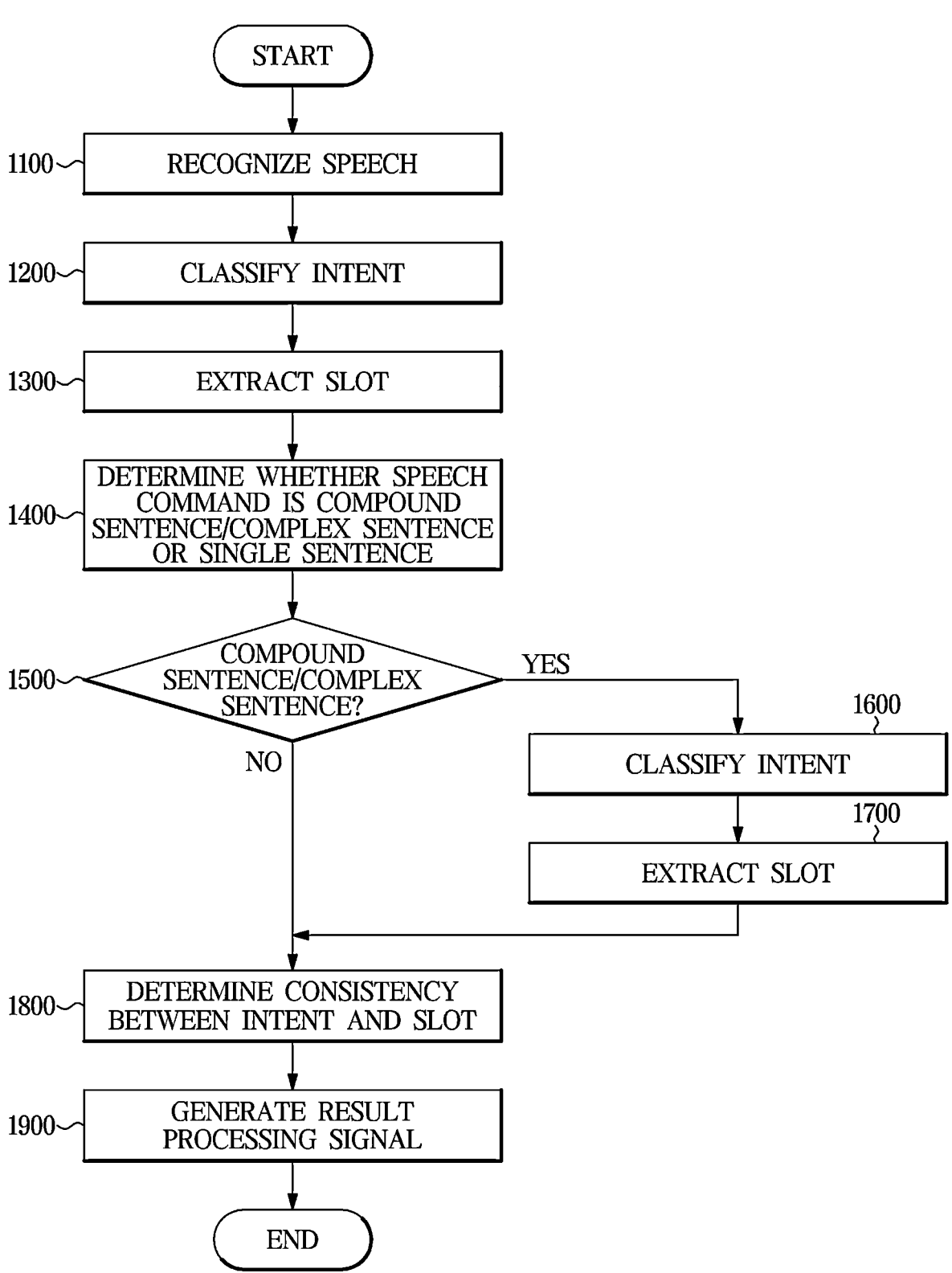
FIG. 6 is a flowchart illustrating operations of a natural language processing method according to an embodiment.

FIG. 6 is a flowchart illustrating operations of a natural language processing method according to an embodiment. The natural language processing method according to an embodiment may be performed by the natural language processing apparatus 100. Accordingly, the above description of the natural language processing apparatus 100 is applicable to embodiments of the natural language processing method, even when not specifically described below. By contrast, a description on the natural language processing method may be applied to embodiments of the natural language processing apparatus 100, even when not specifically described.

Referring to FIG. 6, when a speech command is input from a user terminal of the vehicle 2, and the like, the speech recognition module 110 performs speech recognition on the speech command and converts the input speech command into text (1100).

Based on the text, the natural language understanding module 120 classifies an intent corresponding to the speech command (1200), and extracts a slot included in the speech command (1300).

The control module 130 determines whether the speech command includes a compound sentence/complex sentence or a single sentence, based on an output of the natural language understanding module 120 (1400).

In an embodiment, a single sentence including a plurality of intents is defined as a compound sentence or a complex sentence, and a single sentence including a single intent is defined as a single sentence.

As described above, the natural language understanding module 120 determines whether an input sentence matches each of a plurality of pre-defined intents. The natural language understanding module 120 may calculate and output a matching probability of the input sentence for each of the plurality of pre-defined intents.

The control module 130 may determine that the speech command is a compound sentence or a complex sentence, when a matching probability of a top one intent is not dominant and matching probabilities of top two or more intents are higher than a threshold probability.

Specifically, when a highest matching probability is less than a first reference value and matching probabilities of top two or more intents are greater than a second reference value, the control module 130 may determine that the speech command is a compound sentence or a complex sentence. However, when the number of intents having a matching probability greater than the second reference value exceeds N (N is an integer greater than or equal to 2), only the top N number of intents are used. In other words, based on the matching probabilities, the top M number of intents (2 or more and N number or fewer intents having matching probabilities less than the first reference value and greater than the second reference value) may be used as the intent corresponding to the speech command.

Also, when it is determined that the speech command includes a compound sentence and a complex sentence, the control module 130 may distinguish between a compound sentence and a complex sentence, based on the plurality of intents corresponding to the speech command.

As described above, an intent may be defined as [action-_target]. When two or more intents among a plurality of intents have different actions, the control module 130 may determine the speech command as a complex sentence, and when the plurality of intents have the same action and different slots, the control module 130 may determine the speech command as a compound sentence. For example, it may be determined that a speech command of "bring the window down and close the sunroof" includes a complex sentence, and a speech command of "open the window and the sunroof" includes a compound sentence.

When it is determined that the speech command includes the compound sentence or the complex sentence (Yes in operation 1500), the control module 130 may call the natural language understanding module 120 again to perform intent classification (1600) and slot extraction (1700) again.

When the speech command includes a compound sentence, a text corresponding to the speech command may be input to the natural language understanding module 120 again. In this instance, a pipeline for classifying an intent and extracting a slot on the input text in the natural language understanding module 120 may be different from a pipeline used to perform intent classification (1200) and slot extraction (1300) earlier.

The called natural language understanding module 120 already has information that the speech command is the compound sentence. Accordingly, based on the calculated matching probabilities, the natural language understanding module 120 may determine the top M number of intents as a final intent corresponding to the speech command and determine a role in a sentence as well as a type of a final slot according to the determined intent.

When the speech command includes a complex sentence, like the compound sentence, the text corresponding to the speech command may be input to the natural language understanding module 120 again as it is, or input to the natural language understanding module 120 by dividing the text into a plurality of sentences based on a conjunction.

When the intent classification and slot extraction are completed, the control module 130 may determine a consistency between the intent and the slot (1800).

Specifically, when the determined final intent is a function performable with respect to the extracted final slot, the consistency between the final intent and the final slot may be acknowledged. When the determined final intent is a function which is not performable, the consistency between the final intent and the final slot is not acknowledged. For example, the consistency may be determined based on a consistency table stored in advance.

When the determination of consistency is completed, the control module 130 may generate a result processing signal (1900).

When consistencies of a plurality of final intents are all acknowledged, a control signal for performing a function corresponding to each of the plurality of final intents and system responses for guiding may be generated.

When consistencies of a portion of the plurality of final intents are not acknowledged, a control signal for performing a function corresponding to a final intent whose consistency is acknowledged and a system responses for guiding may be generated.

When consistencies of all of the plurality of final intents are not acknowledged, a system response for informing that a corresponding function is not performable may be generated.

As a result of determining whether the speech command includes a compound sentence/complex sentence or a single sentence, when the speech command does not include a compound sentence/complex sentence, i.e., when the speech command includes a single sentence (No in operation 1500), the control module 130 may determine the consistency between the intent and the slot based on the output of the natural language understanding module 120 (1800) and generate the result processing signal (1900).

In the above description, each operation, i.e., each step, such as operation 1200, operation 1300, and the like, is used to refer to a process of each operation, and these operations are not necessarily required to be performed sequentially. Even when performed sequentially, the order of each operation is not limited by the reference numerals. A portion of operations may be performed simultaneously, and a portion of operations may be performed differently from the flow-chart.

FIGS. 7-9 are diagrams illustrating each processes for different speech commands, in a natural language processing method according to an embodiment.

In FIG. 7, an example where a user inputs a speech command of "open the sunroof and the window" is described.

Referring to FIGS. 6 and 7 together, the speech recognition module 110 may recognize the input speech command and perform conversion into text, "open the sunroof and the window" in operation 1100. The converted text is processed by the natural language understanding module 120, and thus the speech command described below refers to the speech command converted into text.

In operation 1200, the natural language understanding module 120 calculates a matching probability of the speech command for each predefined intent. As a result of calcu-lation, intents having top three matching probabilities are [open_sunroof], [open_window] and [open_all window].

In operation 1300, the natural language understanding module 120 may extract a slot from the speech command. The slots, {sunroof} and {window}, may be extracted from "open the sunroof and the window", and a type of each of the sunroof and the window may be determined as an opening and closing device.

In operation 1400, the control module 130 may determine whether the speech command includes a compound sen-tence/complex sentence or a single sentence. In this example, it is assumed that a first reference value is 0.6 and a second reference value is 0.2. Among intents having the top three matching probabilities, the highest matching prob-ability is 0.46, which is less than the first reference value, and the matching probabilities of [open_sunroof] and [open-_window] are 0.46 and 0.26, respectively, which are greater than the second reference value. Accordingly, the control module 130 may determine that the speech command is a compound sentence/complex sentence.

Also, the control module 130 may distinguish whether the speech command is a compound sentence or a complex sentence. The top two intents having the matching prob-abilities greater than the second reference value, [open_sun-roof] and [open_window], have the same action, [open], and different slots, {sunroof} and {window}. Accordingly, the speech command may be determined as a compound sen-tence.

The text corresponding to the speech command is input to the natural language understanding module 120 again. In operation 1600, the natural language understanding module 120 may determine [open_sunroof] and [open_window] as a final intent. Because the intents have been determined, a role of the final slot extracted in operation 1700 may be deter-mined. As shown in FIG. 7, roles of {sunroof} and {win-dow} may be determined as a target.

In operation 1800, the control module 130 determines a consistency of the final intent and the final slot. Both a function of opening the sunroof and a function of opening the window are performable in the vehicle 2, and thus the control module 130 may determine that the consistencies of two intents are acknowledged.

In operation 1900, the control module 130 may generate a system response like "I will open the sunroof and open the window" and generate a control signal for actually opening the sunroof and the window.

The system response and the control signal may be transmitted to the vehicle 2. The system response may be audibly output through the speaker 220 or visually output through the display 230.

In FIG. 8, an example where a user inputs a speech command of "open the sunroof and music" is described.

Referring to FIGS. 6 and 8 together, the speech recogni-tion module 110 may recognize the input speech command and perform conversion into text, "open the sunroof and music" in operation 1100.

In operation 1200, the natural language understanding module 120 calculates a matching probability of the speech command for each predefined intent. As a result of calcu-lation, intents having top three matching probabilities are [open_sunroof], [play_music] and [close_sunroof].

In operation 1300, the natural language understanding module 120 may extract a slot from the speech command. The slots, {sunroof} and {music}, may be extracted from "open the sunroof and music", and types of the sunroof and the music may be determined as an opening and closing device and content, respectively.

In operation 1400, the control module 130 may determine whether the speech command includes a compound sen-tence/complex sentence or a single sentence. In this example, it is assumed that a first reference value is 0.6 and a second reference value is 0.2. Among intents having the top three matching probabilities, the highest matching prob-ability is 0.5, which is less than the first reference value, and the matching probabilities of [play_music] and [close_sun-roof] are 0.12 and 0.01, respectively, which are less than the second reference value. Accordingly, the control module 130 may determine that the speech command is a single sen-tence, and the intent corresponding to the speech command is [open_sunroof].

In operation 1800, the control module 130 determines a consistency of the intent and the slot. A function of opening the sunroof is performable in the vehicle 2, and thus the control module 130 may determine that the consistency is acknowledged.

In operation 1900, the control module 130 may generate a system response like "I will open the sunroof" and generate a control signal for actually opening the sunroof.

The system response and the control signal may be transmitted to the vehicle 2. The system response may be audibly output through the speaker 220 or visually output through the display 230.

In FIG. 9, an example where a user inputs a speech command of "close the sunroof and the window and play music" is described.

Referring to FIGS. 6 and 9 together, the speech recogni-tion module 110 may recognize the input speech command and perform conversion into text, "close the sunroof and the window and play music" in operation 1100.

In operation 1200, the natural language understanding module 120 calculates a matching probability of the speech command for each predefined intent. As a result of calcu-lation, intents having top three matching probabilities are [play_music], [close_window] and [close_sunroof].

In operation 1300, the natural language understanding module 120 may extract a slot from the speech command. The slots, {sunroof}, {window} and {music}, may be extracted from "close the sunroof and the window and play music", types of the sunroof and the window may be determined as an opening and closing device and a type of music may be determined as content.

In operation 1400, the control module 130 may determine whether the speech command includes a compound sentence/complex sentence or a single sentence. In this example, it is assumed that a first reference value is 0.6 and a second reference value is 0.2. Among intents having the top three matching probabilities, the highest matching probability is 0.42, which is less than the first reference value, and the matching probabilities of [close_window] and [close_sunroof] are 0.24 and 0.21, respectively, which are greater than the second reference value. Accordingly, the control module 130 may determine that the speech command includes a compound sentence/complex sentence.

Also, the control module 130 may distinguish whether the speech command is a compound sentence or a complex sentence. The top three intents having the matching probabilities greater than the second reference value, [play_music], [close_window] and [close_sunroof], have different actions, [play] and [close]. Accordingly, the speech command may be determined as a complex sentence.

The text corresponding to the speech command is input to the natural language understanding module 120 again. In this instance, the control module 130 may divide the speech command into a plurality of sentences based on a conjunction and input the plurality of sentences to the natural language understanding module 120. For example, "close the sunroof and the window and" and "play music" may be input, respectively. Alternatively, similarly to the compound sentence case, the text converted from the speech command may be input again as it is.

In operation 1600, the natural language understanding module 120 may determine [close_sunroof] and [close_window] as a final intent corresponding to "close the sunroof and the window and", and [play_music] as a final intent corresponding to "play music".

Because the intents have been determined, a role of the slot extracted in operation 1700 may be determined. As shown in FIG. 9, roles of {sunroof}, {window} and {music} may be determined as a target.

In operation 1800, the control module 130 determines a consistency of the intent and the slot. A function of opening the sunroof, a function of opening the window and a function of playing music are all performable in the vehicle 2, and thus the control module 130 may determine that the consistencies of three intents are all acknowledged.

In operation 1900, the control module 130 may generate a system response like "I will close the sunroof and the window and play music" and generate a control signal for actually closing the sunroof and the window and a control signal for actually playing music.

The system response and the control signals may be transmitted to the vehicle 2. The system response may be audibly output through the speaker 220 or visually output through the display 230.

According to the above-described embodiments, not confirming a single intent having a highest matching probability in a natural language understanding process as an intent corresponding to the speech command, whether the speech command includes a compound sentence/complex sentence is determined based on a result of natural language understanding. As a result of determination, when the speech command includes a compound sentence/complex sentence, by calling the natural language understanding module 120 again, two or more intents may be confirmed and types and roles of slots corresponding thereto may be finally determined.

Accordingly, when a user utters a speech command for a plurality of functions as a single sentence, although a single intent capable of covering all of the plurality of functions is not defined in advance, the corresponding functions may be performed.

Figure 10:
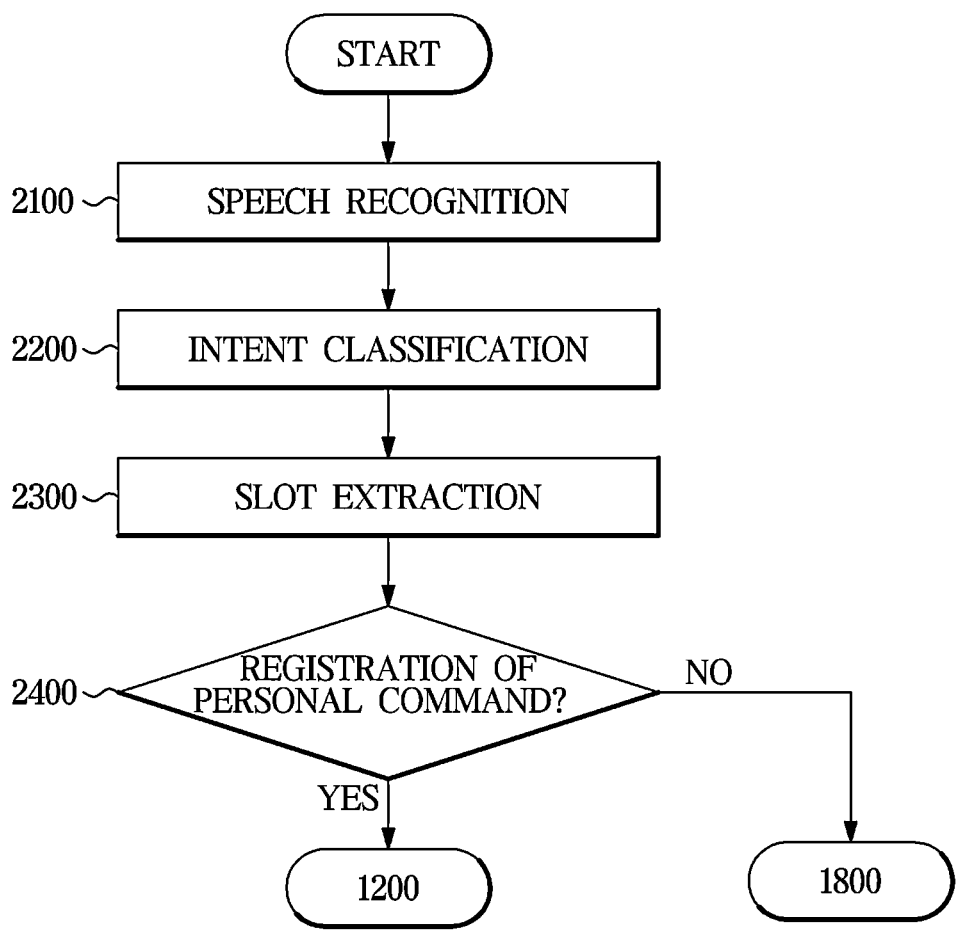
FIG. 10 is a flowchart illustrating operations of registering a personal command by a user, in a natural language processing method according to an embodiment.

FIG. 10 is a flowchart illustrating operations of registering a personal command by a user, in a natural language processing method according to an embodiment. FIG. 11 is a diagram illustrating an example of a process of registering a personal command by a user, in a natural language processing method according to an embodiment.

Referring to FIGS. 10 and 11 together, when a speech command is input from a user terminal of the vehicle 2, and the like, the speech recognition module 110 performs speech recognition on the speech command to perform conversion into text (2100).

For example, to register a personal command, when a user inputs a speech command of "when I say I am sleepy, open the sunroof and the window and play music", the speech recognition module 110 converts the speech command into text and output.

The natural language understanding module 120 may classify an intent (2200) and extract a slot (2300). Although it is illustrated in the flowchart of FIG. 10 that the speech command is a single sentence, the control module 130 may determine whether the speech command is a compound sentence/complex sentence based on an output of the natural language understanding module 120. Like the above example, when an input sentence has a structure of speech template of 'when I say A, do B', because a matching probability of a top one intent, [register personal command], is absolutely high, the speech command may be determined as a single sentence having the corresponding intent.

When a speech command has a sentence structure such as 'when I say A, do B', a section of "when I say A" is a conditional speech section that expresses a command (A) to be registered, and a section of "do B" is a functional speech section that expresses a function (B) to be registered by matching to the command. {I am sleepy} and {open the sunroof and the window and play music} may be extracted as a slot, and a role of {I am sleepy} may be determined as a command and a role of {open the sunroof and the window and play music} may be determined as a functional speech.

When the intent is registration of personal command (Yes in operation 2400), the control module 130 calls the natural language understanding module 120 again. In this instance, a sentence input to the natural language understanding module 120 is a sentence corresponding to the functional speech, not the entire speech command. In the example, "open the sunroof and the window and play music" may be input to the natural language understanding module 120 again.

When the natural language understanding module 120 is called again, operations described with reference to FIG. 6 may be performed.

The intent classification (1200) and the slot extraction (1300) on the functional speech may be performed. In the example, top three intents based on the matching probabilities are [open_sunroof], [open_window] and [play_music], and 'sunroof' and 'window', which are a slot whose type is an opening and closing device, and 'music', which is a slot whose type is content, may be extracted.

The control module 130 may determine whether the functional speech is a compound sentence/complex sentence or a single sentence (1400). A determination criterion thereof is the same as that described in FIG. 6.

In the example, it is assumed that a first reference value is 0.6 and a second reference value is 0.2. Among intents having the top three matching probabilities, the highest matching probability is 0.46, which is less than the first reference value, and the matching probabilities of [open_sunroof], [open_window], and [play_music] are 0.46, 0.22 and 0.21, respectively, which are greater than the second reference value. Accordingly, it may be determined that the speech command is a compound sentence/complex sentence.

Also, the control module 130 may distinguish whether the speech command is a compound sentence or a complex sentence. The top three intents having the matching probabilities greater than the second reference value, [open_sunroof], [open_window], and [play_music], have different actions, [open] and [play]. Accordingly, the speech command may be determined as a complex sentence.

The functional speech is input to the natural language understanding module 120 again. In this instance, the control module 130 may divide the functional speech into a plurality of sentences based on a conjunction and input the plurality of sentences to the natural language understanding module 120. For example, "open the sunroof and the window and" and "play music" may be input, respectively.

The natural language understanding module 120 may determine [open_sunroof] and [open_window] as a final intent corresponding to "open the sunroof and the window and", and [play_music] as a final intent corresponding to "play music" through the intent classification (1600).

Also, the natural language understanding module 120 may extract a slot from each sentence and determine a type and a role of slot through the slot extraction (1700).

In the example, because the intents of "open the sunroof and the window and" are [open_sunroof] and [open_window], roles of the slots, i.e., roles of {sunroof} and {window}, may be determined as a target, respectively. Also, the intent of "play music" is [play_music], and thus a role of the slot, i.e., role of {music}, may be determined as a target as well.

The control module 130 determines a consistency of the intent and the slot (1800). Opening the sunroof, opening the window and playing music are all performable, and thus the consistencies of the three intents are all acknowledged.

The control module 130 generates a result processing signal (1900). The generated result processing signal is a signal for enabling the functions corresponding to each of the intents, [open_sunroof], [open_window], and [play_music], to be performed when the speech command of "I am sleepy" is input. In other words, the control module 130 may map the command of "I am sleepy" to the functions of opening the sunroof, opening the window and playing music.

After registering the personal command, when the text, "I am sleepy", is input to the natural language understanding module 120, the intent may be performing a personalized function, i.e., a function mapped to the registered personal command. For example, [do_personalized function] may be classified as a corresponding intent and {I am sleepy: command} may be extracted as a slot. However, the above is only an example, and a name of intent for performing a personalized function is not limited.

The control module 130 may store a table in which a function assigned to each registered personal command is mapped. The control module 130 may map and store the command of "I am sleepy" to the functions of opening the sunroof, opening the window and playing music. When [do_personalized function] is classified as the corresponding intent and {I am sleepy} is extracted as a slot, whose role is a command, by the natural language understanding module 120, the function mapped and stored to the command may be performed. Although it is described in the example that a function mapped to the personal command is a multiple function, a single function may also be mapped.

A user may use various functions through a single utterance using the above-described personal command registration. For example, when a speech command of "when I say 'what is it like today', play today's top news and weather" is input, "what is it like today" may be registered as a personal command and playing today's top news and playing today's weather may be mapped as a function assigned to the personal command according to the above operations.

Accordingly, after registering the personal command, when the speech command, "what is it like today", is input, the functions mapped to the personal command of "what is it like today", i.e., playing today's top news and playing today's weather, may be performed according to the above operations.

As another example, when a speech command of "when I say 'quietly', turn off a virtual engine sound and turn the volume down" is input, "quietly" may be registered as a personal command and turning off a virtual engine sound and turning the volume down may be mapped as a function assigned to the personal command according to the above operations.

Accordingly, after registering the personal command, when the speech command of "quietly" is input, the function mapped to the personal command of "quietly", i.e., turning off a virtual engine sound and turning the volume down, may be performed according to the above operations.

As is apparent from the above, according to the embodiments of the present disclosure, the natural language processing apparatus and the natural language processing method can determine whether a user's speech command is a compound sentence or a complex sentence based on an output of a natural language understanding module, and when the user's speech command is a compound sentence or a complex sentence, recursively call the natural language understanding module, thereby executing all the plurality of functions expressed as a single sentence.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those having ordinary skill in the art will appreciate that various modifications, additions and substitutions are possible, without departing from the scope and spirit of the present disclosure. Therefore, embodiments have not been described for limiting purposes.

What is claimed is:

1. A natural language processing apparatus comprising:
   at least one memory storing computer-executable instructions;

a processor coupled with the at least one memory, wherein the processor is configured to execute the computer-executable instructions;

a speech recognition module executed by the processor, the speech recognition module configured to convert a speech command of a user to a text;

a natural language understanding module executed by the processor, the natural language understanding module configured to classify an intent corresponding to the speech command and extract a slot included in the speech command based on the text; and a control module executed by the processor, the control module configured to determine whether the speech command includes a compound sentence or a complex sentence based on the intent classified by the natural language understanding module, and when the speech command includes the compound sentence or the complex sentence, re-input the text corresponding to the speech command to the natural language understanding module again, wherein a sentence including a plurality of intents is defined as the compound sentence or the complex sentence, and a sentence including a single intent is defined as a single sentence, and among the plurality of intents, when two or more intents have different actions, the sentence is determined to be the complex sentence, and when actions of the plurality of intents are the same but slots are different, the sentence is determined to be the compound sentence.

2. The natural language processing apparatus of claim 1, wherein the natural language understanding module is configured to calculate a matching probability of the speech command for each of a plurality of pre-defined intents, to classify the intent corresponding to the speech command.

3. The natural language processing apparatus of claim 2, wherein the control module is configured to determine that the speech command includes the compound sentence or the complex sentence when a highest matching probability among the calculated matching probabilities is less than a first reference value and two or more matching probabilities are greater than a second reference value.

4. The natural language processing apparatus of claim 3, wherein the control module is configured to determine that the speech command includes the compound sentence when a top number of intents have an identical action and different slots based on the calculated matching probabilities, and determine that the speech command includes the complex sentence when two or more intents among the top number of intents have different actions, wherein the top number of intents is an integer greater than or equal to two.

5. The natural language processing apparatus of claim 3, wherein the natural language understanding module is configured to determine a final intent and a final slot for the re-input text, based on information about a top number of intents based on the calculated matching probabilities.

6. The natural language processing apparatus of claim 5, wherein the control module is configured to determine a consistency between the final intent and the final slot.

7. The natural language processing apparatus of claim 6, wherein the control module is configured to generate a result processing signal for performing a function corresponding to the final intent whose consistency with the final slot is acknowledged.

8. The natural language processing apparatus of claim 1, wherein, when the speech command includes the complex sentence, the control module is configured to divide the text converted from the speech command into a plurality of sentences and input the divided plurality of sentences to the natural language understanding module again.

9. A natural language processing apparatus comprising:

at least one memory storing computer-executable instructions;

a processor coupled with the at least one memory, wherein the processor is configured to execute the computer-executable instructions;

a speech recognition module executed by the processor, the speech recognition module configured to convert a speech command of a user to a text;

a natural language understanding module executed by the processor, the natural language understanding module configured to classify an intent corresponding to the speech command and extract a slot included in the speech command based on the text; and a control module executed by the processor, the control module configured to re-input a functional speech corresponding to the speech command, the functional speech indicating a function to be registered that matches a personal command to the natural language understanding module again, when the intent classified by the natural language understanding module is registration of the personal command, wherein the natural language understanding module is re-invoked to perform intent classification and slot extraction for the functional speech, wherein the control module is configured to determine whether the functional speech is a single sentence, a compound sentence, or a complex sentence, wherein a sentence including a plurality of intents is defined as the compound sentence or the complex sentence, and a sentence including a single intent is defined as a single sentence, and among the plurality of intents, when two or more intents have different actions, the sentence is determined to be the complex sentence, and when actions of the plurality of intents are the same but slots are different, the sentence is determined to be the compound sentence.

10. The natural language processing apparatus of claim 9, wherein the natural language understanding module is configured to classify an intent corresponding to the re-input functional speech and extract a slot included in the re-input functional speech.

11. The natural language processing apparatus of claim 10, wherein the control module is configured to store another function defined by the intent corresponding to the functional speech and the slot included in the functional speech, as the function corresponding to the personal command.

12. The natural language processing apparatus of claim 11, wherein the control module is configured to generate a control signal for performing the function corresponding to the personal command, when a speech command of the user input after the personal command is registered includes the registered personal command.

13. A natural language processing method comprising:

converting, by a speech recognition module executed by a processor, a speech command of a user to a text;

classifying, by a natural language understanding module executed by the processor, an intent corresponding to the speech command and extracting a slot included in the speech command based on the text;

determining, by a control module executed by the processor, whether the speech command includes a compound sentence or a complex sentence based on the classified intent; and when the speech command includes the compound sentence or the complex sentence, re-inputting, by the control module, the text corresponding to the speech command to the natural language understanding module again, wherein a sentence including a plurality of intents is defined as the compound sentence or the complex sentence, and a sentence including a single intent is defined as a single sentence, and among the plurality of intents, when two or more intents have different actions, the sentence is determined to be the complex sentence, and when actions of the plurality of intents are the same but slots are different, the sentence is determined to be the compound sentence.

14. The natural language processing method of claim 13, wherein the determining of whether the speech command includes the compound sentence or the complex sentence comprises calculating a matching probability of the speech command for each of a plurality of pre-defined intents, to classify the intent corresponding to the speech command.

15. The natural language processing method of claim 14, wherein the determining of whether the speech command includes the compound sentence or the complex sentence comprises determining that the speech command includes the compound sentence or the complex sentence, when a highest matching probability among the calculated matching probabilities is less than a first reference value and two or more matching probabilities are greater than a second reference value.

16. The natural language processing method of claim 15, wherein the determining of whether the speech command includes the compound sentence or the complex sentence comprises determining that the speech command includes the compound sentence, when a top number of intents have an identical action and different slots based on the calculated matching probabilities, and determining that the speech command includes the complex sentence when two or more intents among the top number of intents have different actions, wherein the top number of intents is an integer greater than or equal to two.

17. The natural language processing method of claim 15, further comprising:

determining a final intent and a final slot for the re-input text, based on information about a top number of intents based on the calculated matching probabilities.

18. The natural language processing method of claim 17, further comprising:

determining a consistency between the final intent and the final slot.

19. The natural language processing method of claim 18, further comprising:

generating a result processing signal for performing a function corresponding to the final intent whose consistency with the final slot is acknowledged.

20. The natural language processing method of claim 13, wherein the re-inputting of the text corresponding to the speech command to the natural language understanding module again comprises, when the speech command includes the complex sentence, dividing the text converted from the speech command into a plurality of sentences, and inputting the divided plurality of sentences to the natural language understanding module again.

* * * * *